(12) United States Patent  
Antoniazzi et al.

(10) Patent No.: US 6,669,006 B2
(45) Date of Patent: Dec. 30, 2003

(54) METHOD AND DEVICE FOR CONVEYING REAMS OF PAPER

(75) Inventors: Luca Antoniazzi, Bologna (IT); Andrea Cinotti, Bologna (IT)

(73) Assignee: Innopack, S.r.l. (IT)

( * ) Notice: Subject to any disclaimer, the term of this patent is extended or adjusted under 35 U.S.C. 154(b) by 0 days.

(21) Appl. No.: 10/057,573

(22) Filed: Jan. 25, 2002

(65) Prior Publication Data

US 2002/0130014 A1 Sep. 19, 2002

(30) Foreign Application Priority Data

Jan. 26, 2001 (IT) ...................... TO2001A0074

(51) Int. Cl.[7] .............................................. B65G 47/31
(52) U.S. Cl. ................................................... 198/461.1
(58) Field of Search ............................ 198/461.1–461.3

(56) References Cited

U.S. PATENT DOCUMENTS 3,452,855 A   7/1969   Baker et al.
6,510,939 B2 *  1/2003  Gamberini .............. 198/461.3

FOREIGN PATENT DOCUMENTS

| EP | 0 163 330 A | 12/1985 |
| EP | 0 825 118 A | 2/1998 |
| FR | 1 531 247 A | 6/1968 |
| GB | 1 471 769 A | 4/1977 |

* cited by examiner

Primary Examiner—Joseph E. Valenza
(74) Attorney, Agent, or Firm—Michael Best & Friedrich; Larry L. Saret

(57) ABSTRACT

A method and device for conveying reams of paper, whereby a ream is conveyed by at least two conveyors arranged in series and connected to each other at a transfer station; and wherein at least a first of the two conveyors is an endless conveyor having at least one ream pusher and traveling at a first speed to feed a ream to the transfer station, where the ream is accelerated to a second speed greater than the first speed to detach itself from the pusher by a distance at least equal to the length of the pusher before leaving the first conveyor.

16 Claims, 1 Drawing Sheet

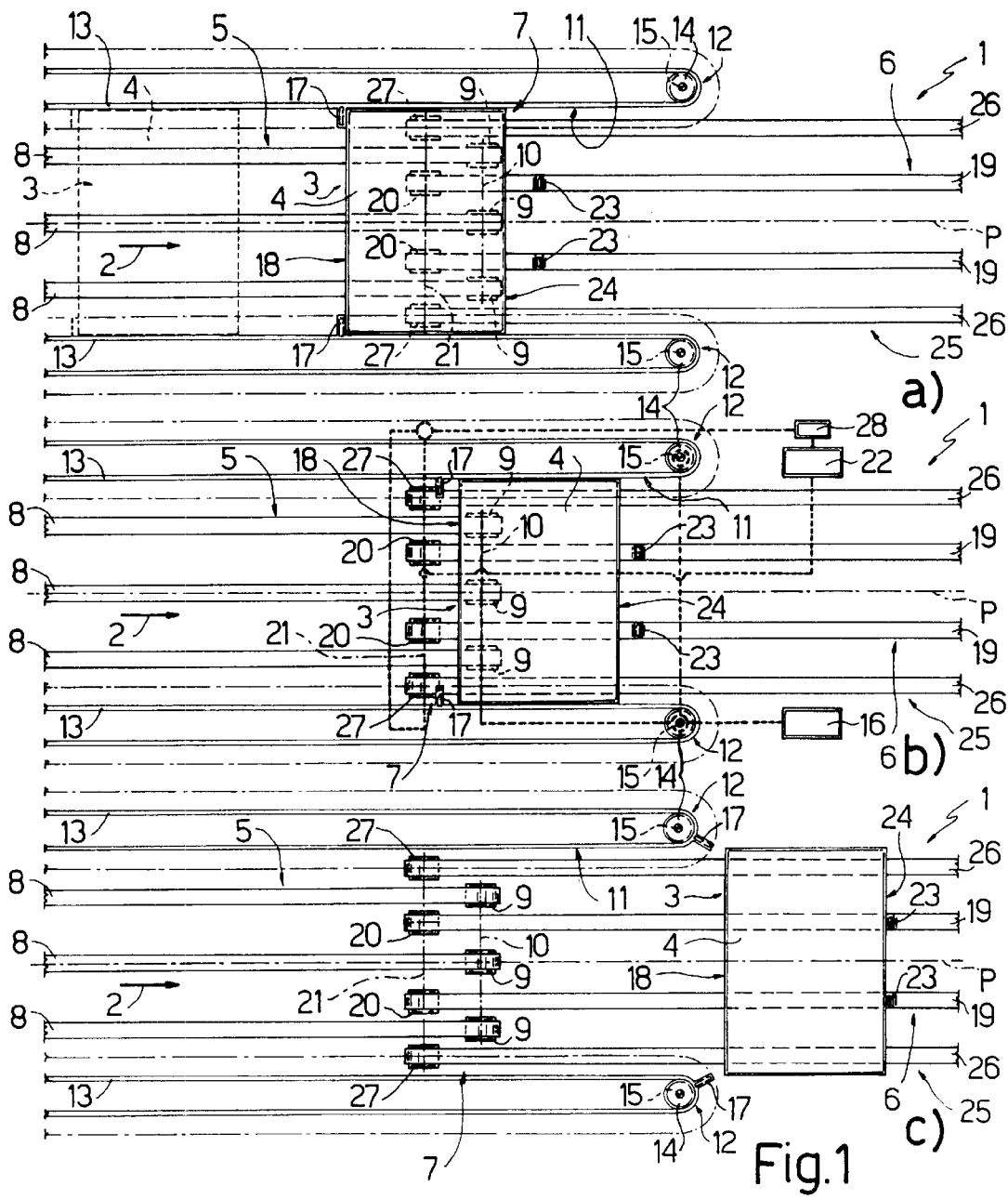

METHOD AND DEVICE FOR CONVEYING REAMS OF PAPER

The present invention relates to a method of conveying reams of paper.

More specifically, the present invention relates to a method of conveying reams of paper along a path defined by at least a first and a second conveyor arranged in series in a given traveling direction and connected to each other at a transfer station; at least the first conveyor, upstream from the second in said traveling direction, being an endless conveyor comprising at least one pusher which is movable with the first conveyor, is of a given length, and engages and pushes a ream to said transfer station.

BACKGROUND OF THE INVENTION

When a ream of paper is conveyed in known manner as described above, the pusher, which engages and feeds the ream from behind to the transfer station, releases the ream inside the transfer station, normally by a belt member driving the pusher about a pulley at the transfer station.

The above transfer method has several drawbacks, owing to the pusher, as it moves about the pulley, not only imparting variable acceleration to the ream being transferred, which is thus extremely difficult to transfer to the second conveyor in a precise position, but also exerting on the ream localized pressure along a line as opposed to on a surface. This latter drawback is normally negligible when transferring solid bodies, but is critical when transferring reams. That is, if the ream being transferred is even only slightly deformed, the line of contact between the pusher and the ream may be reduced to only a few points, thus resulting in partial damage to, and subsequent rejection of, the ream.

SUMMARY OF THE INVENTION

It is an object of the present invention to provide a method of conveying reams of paper, which is straightforward and cheap to implement and, at the same time, provides for eliminating the aforementioned drawbacks.

According to the present invention, there is provided a method of conveying reams of paper along a path defined by at least a first and a second conveyor arranged in series in a given traveling direction and connected to each other at a transfer station; at least the first conveyor, upstream from the second in said traveling direction, being an endless conveyor comprising at least one pusher which is movable with the first conveyor, is of a given length, and engages and pushes a ream to said transfer station; the method being characterized by comprising the steps of feeding the ream to said transfer station at a first speed by means of said first conveyor; and transferring the ream to the second conveyor by bringing the ream to a second speed greater than said first speed, so as to detach the ream from the pusher by a distance at least equal to said length before the ream leaves said first conveyor.

The method defined above preferably also comprises the further step of conveying the ream, by means of said second conveyor, at a third speed lower than said second speed.

By exploiting the difference between the second and third speed, it is therefore possible to release the ream in a specific position on the second conveyor.

The present invention also relates to a device for conveying reams of paper.

According to the present invention, there is provided a device for conveying reams of paper along a given path, the device comprising at least a first and a second conveyor arranged in series in a given traveling direction and connected to each other at a transfer station; at least said first conveyor, upstream from the second in said traveling direction, being an endless conveyor comprising at least one pusher which is of a given length and movable with the first conveyor to engage and push a respective ream to said transfer station; the device being characterized by comprising first drive means connected to said first conveyor to feed the ream to said transfer station at a first speed; and accelerating means for engaging the ream at said transfer station and conveying the ream at a second speed greater than said first speed and such as, in use, to detach the ream from the pusher by a distance at least equal to said length before the ream leaves said first conveyor.

BRIEF DESCRIPTION OF THE DRAWINGS

A non-limiting embodiment of the present invention will be described by way of example with reference to the accompanying drawings, in which:

FIG. 1 shows a partial, schematic plan view of a preferred embodiment of the ream conveying device according to the present invention in three distinct operating positions;

FIG. 2 shows a graph of the traveling speed of a ream of paper along the FIG. 1 conveying device.

DETAILED DESCRIPTION OF THE INVENTION

Number 1 in FIG. 1 indicates as a whole a conveying device for feeding in a direction 2 and along a path P a succession of reams 3 of paper, each defined by a stack of sheets 4 arranged in a substantially horizontal position parallel to the FIG. 1 plane.

Conveying device 1 comprises two conveyors 5 and 6 arranged in series in direction 2 and connected to each other at a transfer station 7, and of which conveyor 5, located upstream from conveyor 6 in direction 2, is an endless conveyor comprising three parallel, side by side, endless belts 8 extending about respective pulleys 9 located at transfer station 7 and rotating about a common substantially horizontal axis 10 crosswise to direction 2. Belts 8 support the reams 3 fed successively to transfer station 7, and feed reams 3 along a channel 11 defined at the bottom by a top work branch of belts 8, and laterally by the work branches of two endless conveyors 12, each of which forms part of conveyor 5 and comprises a respective belt 13 looped about a respective pulley 14 located at transfer station 7 and having an axis 15 perpendicular to the FIG. 1 plane. The two pulleys 14 are located downstream from pulleys 9 in direction 2 by a distance at least equal to the length of a ream 3 measured in direction 2.

Pulleys 9 and 14 are powered by a motor 16 (only shown in FIG. 1b for the sake of simplicity), and each belt 13 is fitted with at least one pusher 17 which cooperates with a rear surface 18 of a respective ream 3 and, by virtue of the traction imparted by motor 16 to respective belt 13, engages channel 11 cyclically, in use, and travels along the channel, in direction 2 and in time with a corresponding pusher 17 on the other belt 13, to feed ream 3 to transfer station 7 at a given speed V1 equal to the traveling speed of belts 8.

Conveyor 6 is located downstream from conveyor 5 in direction 2, and is an endless conveyor defined, in the example shown, by two parallel, side by side, endless belts 19 looped about respective pulleys 20 located at transfer station 7 and rotating about a common substantially horizontal axis 21 crosswise to direction 2 and upstream from axis 10 in direction 2. More specifically, each belt 19 is inserted partly, at transfer station 7, between a respective pair of belts 8 to define an overlapping portion of belts 8 and 19, has a work branch substantially coplanar with the work branches of belts 8, is driven, together with the other belt 19, by a motor 22 (only shown in FIG. 1b for the sake of simplicity), and is fitted with at least one substantially vertical stop member 23 which, by virtue of the traction imparted by motor 22 to belts 19, travels along path P, in time with stop member 23 of the other belt 19 and a speed V2 normally equal to V1, and cooperates with a front lateral surface 24 of a respective ream 3.

Conveying device 1 also comprises a launching conveyor 25 defined, in the example shown, by two parallel, side by side, endless belts 26, each looped about a respective pulley 27 coaxial with axis 21. Belts 26 are located on opposite sides of belts 8, and each has a work branch substantially coplanar with the work branches of belts 8 and 19, and is driven, together with the other belt 26, by motor 22 (only shown in FIG. 1b for the sake of simplicity) via a reduction unit 28 for imparting to belts 26 a traveling speed V3 greater than V1 and V2. In the example shown, belts 26 extend indefinitely along belts 19, but, in actual fact, may terminate a relatively short distance downstream from pulleys 14.

In actual use, as a ream 3, engaged at the rear by pushers 17 of belts 13, reaches transfer station 7 at speed V1 and is positioned with a front portion (FIG. 1a) on the initial portion of the work branches of belts 19 and 26, stop members 23 are positioned slightly ahead of front surface 24 of ream 3.

On contacting belts 26, which are traveling at speed V3 greater than speeds V1 and V2, ream 3 is accelerated, is gradually detached from pushers 17 (FIG. 1b), and, still guided laterally by belts 13, is slid forward along belts 19 until it is arrested, with respect to belts 19, against stop members 23 by which it is maintained at speed V2 for the rest of its travel.

The speed V3 to V1 ratio is such as to detach ream 3 from pushers 17 by a distance at least equal to the length of pushers 17 before reaching stop members 23, so as to enable pushers 17 to rotate about pulleys 14 without engaging, and thereby possibly damaging, ream 3.

What is claimed is:

1. A method of conveying reams of paper along a path defined by at least a first and a second conveyor arranged in series in a given travelling direction and connected to each other at a transfer station; at least the first conveyor, upstream from the second in said travelling direction (2), being an endless conveyor comprising at least one pusher which is movable with the first conveyor (5), is of a given length, and engages and pushes a ream to said transfer station; the method being characterized by comprising the steps of feeding the ream (3) to said transfer station at a first speed by means of said first conveyor; and transferring the ream to the second conveyor by bringing the ream to a second speed greater than said first speed, so as to detach the ream from the pusher by a distance at least equal to said length before the ream leaves said first conveyor.

2. A method as claimed in claim 1, and comprising the further step of conveying the ream, by means of said second conveyor, at a third speed lower than said second speed.

3. A method as claimed in claim 2, wherein said second conveyor has at least one stop member movable with the second conveyor (6) at said third speed; said stop member intercepting said ream travelling at said second speed, to brake and position the ream in a given position on the second conveyor.

4. A method as claimed in claim 2, wherein the ream is transferred from the first to the second conveyor by means of a third conveyor travelling at said second speed and having a first portion overlapping the first conveyor, and a second portion overlapping the second conveyor.

5. A method as claimed in claim 1, wherein said ream is conveyed at said second speed by friction.

6. A device for conveying reams of paper along a given path, the device comprising at least a first and a second conveyor arranged in series in a given travelling direction and connected to each other at a transfer station; at least said first conveyor, upstream from the second in said travelling direction, being an endless conveyor comprising at least one pusher which is of a given length and movable with the first conveyor to engage and push a respective ream to said transfer station; the device being characterized by comprising first drive means connected to said first conveyor to feed the ream to said transfer station at a first speed; and accelerating means for engaging the ream at said transfer station and conveying the ream at a second speed greater than said first speed and such as, in use, to detach the ream from the pusher by a distance at least equal to said length before the ream leaves said first conveyor.

7. A device as claimed in claim 6, and comprising second drive means for driving said second conveyor at a third speed lower than said second speed.

8. A device as claimed in claim 7, wherein said second conveyor comprises at least one stop member movable with the second conveyor at said third speed.

9. A device as claimed in claim 7, wherein said accelerating means comprise a third conveyor, and third drive means for driving the third conveyor at said second speed; the third conveyor comprising a first portion extending along said first conveyor, and a second portion extending along said second conveyor.

10. A device as claimed in claim 9, wherein said third conveyor is a friction conveyor; said second and said third conveyor being side by side and coplanar with each other.

11. A device as claimed in claim 6, wherein said first conveyor comprises a number of coplanar endless first belts for supporting said ream, and two endless second belts perpendicular to the first belts, facing each other over the first belts, and located on opposite sides of the first belts to define, with said first belts, a channel for feeding the reams to said transfer station; each said second belt being fitted with a respective said pusher facing and in time with the pusher on the other said second belt.

12. A device as claimed in claim 11, wherein said second belts project a given distance beyond said first belts in said travelling direction.

13. A device as claimed in claim 11, wherein said second conveyor comprises a number of third belts coplanar with said first belts; each said third belt having a portion interposed between two adjacent first belts.

14. A device as claimed in claim 9, wherein said third conveyor comprises two endless fourth belts coplanar with said third belts and located on opposite sides of the third belts.

15. A method of conveying reams of paper along a path defined by at least a first and a second conveyor arranged in series in a given travelling direction and connected to each other at a transfer station; at least the first conveyor, upstream from the second in said travelling direction, being an endless conveyor comprising at least one pusher which is movable with the first conveyor, is of a given length, and engages and pushes a ream to said transfer station; the method comprising the steps of feeding the ream to said transfer station at a first speed by means of said first conveyor; transferring the ream to the second conveyor by bringing the ream to a second speed greater than said first speed, so as to detach the ream from the pusher by a distance at least equal to said length before the ream leaves said first conveyor; and conveying the ream, by means of said second conveyor, at a third speed lower than said second speed; wherein said second conveyor has at least one stop member movable with the second conveyor at said third speed; said stop member intercepting said ream travelling at said second speed, to brake and position the ream in a given position on the second conveyor.

16. A device for conveying reams of paper along a given path, the device comprising at least a first and a second conveyor arranged in series in a given travelling direction and connected to each other at a transfer station; at least said first conveyor, upstream from the second in said traveling direction, being an endless conveyor comprising at least one pusher which is of a given length and movable with the first conveyor to engage and push a respective ream to said transfer station; first drive means connected to said first conveyor to feed the ream to said transfer station at a first speed; accelerating means for engaging the ream at said transfer station and conveying the ream at a second speed greater than said first speed and such as, in use, to detach the ream from the pusher by a distance at least equal to said length before the ream leaves said first conveyor; and second drive means for driving said second conveyor at a third speed lower than said second speed; wherein said second conveyor comprises at least one stop member movable with the second conveyor at said third speed.

* * * * *